United States Patent
Moriya et al.

[11] Patent Number: 6,143,426
[45] Date of Patent: Nov. 7, 2000

[54] OPTICAL RECORDING MEDIUM HAVING DUAL INFORMATION SURFACES

[75] Inventors: Mitsurou Moriya, Ikoma; Shin-ichi Tanaka, Kyoto; Yasuhiro Sugihara, Katano; Hiroshi Taniguchi, Hirakata; Michiyoshi Nagashima, Ikoma, all of Japan

[73] Assignee: Matsushita Electric Industrial Co., Ltd., Osaka, Japan

[21] Appl. No.: 09/183,310

[22] Filed: Oct. 30, 1998

Related U.S. Application Data

[63] Continuation of application No. 08/895,787, Jul. 17, 1997, Pat. No. 5,878,018, which is a continuation of application No. 08/577,253, Dec. 22, 1995, Pat. No. 5,726,969.

[30] Foreign Application Priority Data

Dec. 28, 1994 [JP] Japan ................................. 6-327961
Nov. 30, 1995 [JP] Japan ................................. 7-31337

[51] Int. Cl.$^7$ .................................................. B32B 3/02
[52] U.S. Cl. ...................... 428/641; 428/64.2; 428/64.4; 428/64.5; 428/65.2; 428/913; 430/270.13; 430/495.1; 430/945; 369/275.1; 369/283; 369/288
[58] Field of Search ....................... 428/64.1, 64.2, 428/64.4, 64.5, 65.2, 213, 913; 430/270.13, 495.1, 945; 369/275.1, 275.4, 283, 288

[56] References Cited

U.S. PATENT DOCUMENTS

| | | | |
|---|---|---|---|
| 4,450,553 | 5/1984 | Holster et al. | 369/275 |
| 4,726,008 | 2/1988 | Renaud | 369/94 |
| 4,809,022 | 2/1989 | Wilkinson et al. | 346/135.1 |
| 4,908,813 | 3/1990 | Ojima et al. | 369/94 |
| 4,972,404 | 11/1990 | Yamaguchi et al. | 369/284 |
| 5,146,438 | 9/1992 | Harper | 369/13 |
| 5,202,880 | 4/1993 | Lee et al. | 369/275.2 |
| 5,303,225 | 4/1994 | Satoh et al. | 369/275.3 |
| 5,312,663 | 5/1994 | Kosinski et al. | 428/64 |
| 5,360,652 | 11/1994 | Kobayashi et al. | 428/64 |
| 5,401,610 | 3/1995 | Miwa et al. | 430/271 |
| 5,420,834 | 5/1995 | Finkelstein et al. | 369/13 |

(List continued on next page.)

FOREIGN PATENT DOCUMENTS

| | | | |
|---|---|---|---|
| 0409663A2 | 1/1991 | European Pat. Off. | G11B 7/24 |
| 0437223 | 7/1991 | European Pat. Off. | G11B 3/24 |
| 0520619A1 | 12/1992 | European Pat. Off. | G11B 7/24 |
| 0706178 | 4/1996 | European Pat. Off. | G11B 7/26 |
| WO9628818 | 9/1996 | European Pat. Off. | G11B 7/135 |
| 0737966A1 | 10/1996 | European Pat. Off. | G11B 7/24 |
| 0745985A2 | 12/1996 | European Pat. Off. | G11B 7/24 |
| 4041199 | 9/1992 | Germany | C09J 5/00 |
| 61248246 | 11/1986 | Japan | G11B 7/24 |
| 2165439 | 6/1990 | Japan | G11B 7/135 |
| 3035446 | 2/1991 | Japan | G11B 7/24 |
| 3209642 | 9/1991 | Japan | G11B 7/24 |
| 3268251 | 11/1991 | Japan | G11B 11/10 |

OTHER PUBLICATIONS

Search Report for European Patent Application Serial No. 98110772.5 dated Jan. 28, 1999.
Office Action for Korean Patent Application Serial No. 95–72171 dated Nov. 23, 1998.
Search Report for European Patent Application Serial No. 95120544.2 dated Jan. 30, 1997.

*Primary Examiner*—Elizabeth Evans
*Attorney, Agent, or Firm*—Renner, Otto, Boisselle & Sklar

[57] ABSTRACT

The optical recording medium of this invention includes: a first substrate having a first information surface; a semi-transparent reflection film formed on the first information surface of the first substrate; a second substrate having a second information surface; a reflection film formed on the second information surface of the second substrate; and an adhesive layer for adhering the first substrate and the second substrate so that the first information surface and the second information surface face each other, wherein the thickness of the first substrate is 0.56 mm or more, the thickness of the adhesive layer is 30 μm or more, and the total thickness of the first substrate and the adhesive layer is 0.68 mm or less.

13 Claims, 7 Drawing Sheets

U.S. PATENT DOCUMENTS

| | | | |
|---|---|---|---|
| 5,428,597 | 6/1995 | Satoh et al. | 369/275.1 |
| 5,470,627 | 11/1995 | Lee et al. | 428/64.4 |
| 5,479,394 | 12/1995 | Yashima et al. | 369/275.1 |
| 5,485,452 | 1/1996 | Maeda | 369/284 |
| 5,533,001 | 7/1996 | Watanabe et al. | 369/275.2 |
| 5,606,546 | 2/1997 | Best et al. | 369/275.1 |
| 5,608,715 | 3/1997 | Yokogawa et al. | 369/275.1 |
| 5,608,717 | 3/1997 | Ito et al. | 369/275.3 |
| 5,608,718 | 3/1997 | Schiewe | 369/275.4 |
| 5,625,609 | 4/1997 | Latta et al. | 369/44.23 |
| 5,627,814 | 5/1997 | Lee | 369/116 |
| 5,629,917 | 5/1997 | Kamatani | 369/112 |
| 5,673,251 | 9/1997 | Suzuki et al. | 637/275.4 |
| 5,708,652 | 1/1998 | Ohki et al. | 369/275.1 |
| 5,708,653 | 1/1998 | Okada et al. | 369/275.1 |
| 5,716,761 | 2/1998 | Iida et al. | 430/321 |
| 5,729,533 | 3/1998 | Marquardt | 369/273 |
| 5,764,619 | 6/1998 | Nishiuchi | 369/275.1 |

$t0 \geq 30 \mu m$
$t1 \geq 0.56 mm$
$t0 + t1 \leq 0.68 mm$

OPTICAL RECORDING MEDIUM HAVING DUAL INFORMATION SURFACES

This application is a continuation of U.S. Ser. No. 08/895,787 filed Jul. 17, 1997 now U.S. Pat. No. 5,878,018 issued Mar. 2, 1999, which is a continuation of U.S. Ser. No. 08/577,253 filed Dec. 22, 1995 now U.S. Pat. No. 5,726,969 issued Mar. 10, 1998.

BACKGROUND OF THE INVENTION

1. Field of the Invention

The present invention relates to an optical recording medium where a light beam is focused on the recording medium and information is reproduced by detecting light reflected from the recording medium. Particularly, the present invention relates to an optical recording medium having dual information surfaces.

2. Description of the Related Art

In recent years, optical recording media have become more and more important as a means for storing sound information data, image information data, and various information apparatus data because they can store and reproduce a large amount of data. There are still requirements for further increasing the capacity of the optical recording media and reducing the size of optical recording/reproducing apparatuses. In order to satisfy these requirements, the storage capacity of the optical recording media needs to be further increased.

Compact disks (CDs) having one information surface, for example, are known as a conventional read-only optical recording medium. The CD includes a spiral information track composed of convex and concave portions (pits) formed on a surface of a disk-shaped resin substrate with a thickness of 1.2 mm. A reflection film made of aluminum and the like and a protection film are formed on the resultant information surface of the substrate by sputtering and the like. An identification label is then printed on the protection film.

The storage capacity of such a CD is small because the CD has only one information surface. In order to increase the storage capacity, a recording medium where two disks are adhered together, such as a 5" magneto-optical (MO) disk, has been commercialized. The 5" (MO) disk is classified into two types; a disk having one information surface (one-sided disk) and a disk having two information surfaces (double-sided disk). The one-sided disk includes a spiral guide groove composed of convex and concave portions formed on a surface of a disk-shaped resin substrate with a thickness of 1.2 mm. A dielectric film, a magneto-optical recording material film, another dielectric film, and a reflection film made of aluminum and the like are formed in this order on the resultant information surface of the substrate by sputtering and the like. Another resin substrate with a thickness of 1.2 mm is then adhered to the reflection film. The double-sided disk includes a spiral guide groove composed of convex and concave portions formed on a surface of a disk-shaped resin substrate with a thickness of 1.2 mm. A dielectric film, a magneto-optical recording material film, another dielectric film, and a reflection film made of aluminum and the like are formed in this order on the resultant information surface of the substrate by sputtering and the like. The thus-fabricated disk is adhered with another disk fabricated in the same manner. Conventional 5" MO disk recording/reproducing apparatuses are designed to receive both the one-sided disk and the double-sided disk to accomplish the recording and reproduction. The user can select the one-sided disk when information to be recorded is small or the double-sided disk when it is large. The 5" MO disk apparatuses are generally provided with only one optical head. Accordingly, when the double-sided disk is used, the disk needs to be taken out and turned over to continue the recording or reproduction.

In general, the information density of a recording medium is determined by the pitch of an information track and the information density in the tracking direction, i.e., the information linear density. In order to increase the information density of the recording medium, the track pitch should be small, while the linear density should be large. In recent years, there have been studies to increase the density of the optical recording medium by reducing the thickness of the substrate to 0.6 mm, for example, to reduce the aberration of a light beam passing through the substrate due to a tilt of the disk.

However, the above conventional techniques have the following problems. In the case of the conventional double-sided optical recording medium, if both the top and bottom surfaces of the recording medium are illuminated with light beams so as to record information or reproduce recorded information, little space is left on the surfaces of the recording medium for printing an identification label. This is inconvenient for handling the recording medium. Also, when the conventional double-sided optical recording medium is used for an optical reproduction apparatus having only one optical head, the optical recording medium needs to be taken out from the apparatus and turned over to continue the reproduction. In order to continue the reproduction automatically, two optical heads disposed above and below the recording medium are required. An apparatus having two optical heads is large in size and its cost is high.

Another problem is that when a new optical recording medium thinner than the conventional optical recording media is commercialized to increase the density of the recording medium, such a new optical recording medium is not compatible with the conventional recording/reproduction apparatus.

SUMMARY OF THE INVENTION

The optical recording medium of this invention includes: a first substrate having a first information surface; a semi-transparent reflection film formed on the first information surface of the first substrate; a second substrate having a second information surface; a reflection film formed on the second information surface of the second substrate; and an adhesive layer for adhering the first substrate and the second substrate so that the first information surface and the second information surface face each other, wherein the thickness of the first substrate is 0.56 mm or more, the thickness of the adhesive layer is 30 µm or more, and the total thickness of the first substrate and the adhesive layer is 0.68 mm or less.

In one embodiment, the thickness of the first substrate is in the range of 0.56 mm to 0.6 mm, and the thickness of the adhesive layer is in the range of 40 µm to 60 µm.

In another embodiment, a recording material film is formed on the reflection film for the second substrate for recording and reproducing information.

In still another embodiment, the recording material film is made of a phase-change type recording material.

In still another embodiment, a label is formed on a surface of the second substrate.

In still another embodiment, a spiral track is formed on each of the first and second substrates, and the direction of the formation of the spiral track on the first substrate is the same as the direction of the formation of the spiral track on the second substrate when the spiral tracks are viewed from the side of a surface of the first substrate opposite to the first information surface.

In still another embodiment, a spiral track is formed on each of the first and second substrates, and the direction of the formation of the spiral track on the first substrate is reverse to the direction of the formation of the spiral track on the second substrate when the spiral tracks are viewed from the side of a surface of the first substrate opposite to the first information surface.

Alternatively, the optical recording medium of this invention includes: a first substrate having a first information surface; a semitransparent reflection film formed on the first information surface of the first substrate; a second substrate having a second information surface; a reflection film formed on the second information surface of the second substrate; and an adhesive layer for adhering the first substrate and the second substrate so that the first information surface of the first substrate faces a surface of the second substrate opposite to the second information surface, wherein the thickness of the first substrate is substantially the same as the thickness of the second substrate.

Alternatively, the optical recording medium of this invention includes: a first substrate having a first information surface; a semitransparent reflection film formed on the first information surface of the first substrate; a second substrate having a second information surface; a reflection film formed on the second information surface of the second substrate; an adhesive layer for adhering the first substrate and the second substrate so that the first information surface of the first substrate faces a surface of the second substrate opposite to the second information surface; and a label formed on the reflection film for the second substrate, wherein the thickness of the first substrate is substantially the same as the thickness of the second substrate.

Thus, the invention described herein makes possible the advantages of (1) providing an optical recording medium having dual information surfaces where a label can be easily printed on a surface of the recording medium, information can be automatically reproduced by use of one optical head, and the compatibility with an optical recording medium having one information surface can be secured, and (2) providing an optical recording medium which includes a substrate with a thickness different from the conventional standard but is compatible with conventional apparatuses so that information stored in the optical recording medium can be reproduced.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of examples with reference to the accompanying drawings.

EXAMPLE 1

Figure 1:
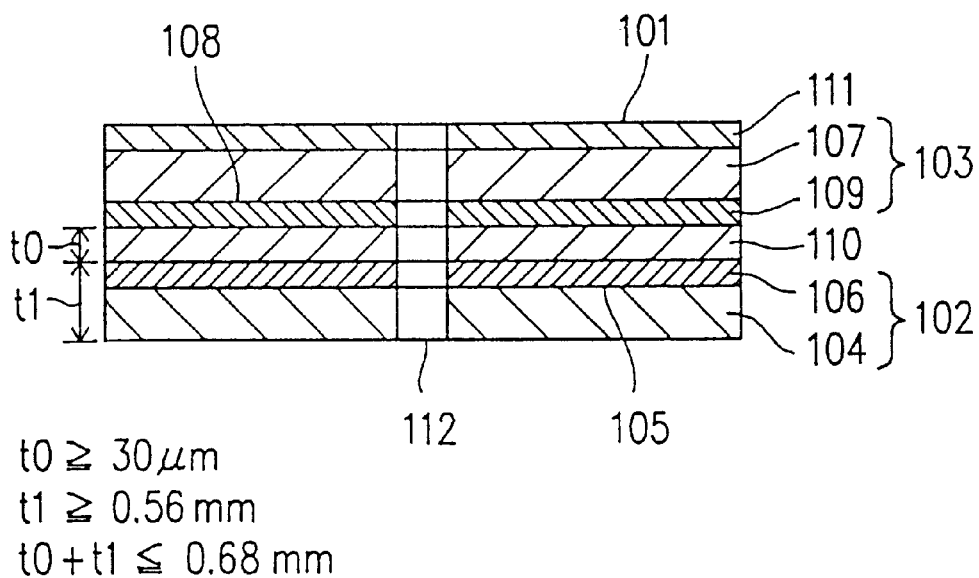
FIG. 1 is a sectional view of an optical recording medium of Example 1 according to the present invention.

FIG. 1 is a schematic sectional view showing an optical recording medium 101 of Example 1 according to the present invention. The optical recording medium 101 is a one-side read type recording medium composed of a first optical disk 102 and a second optical disk 103 adhered to each other. Such an optical recording medium can provide excellent performance as a digital video disk (DVD).

The first optical disk 102 includes a disk-shaped first substrate 104 having a first information surface 105 where a spiral information track composed of convex and concave portions (pits) is formed. A semitransparent first reflection film 106 is formed on the first information surface 105 of the first substrate 104 by sputtering and the like. The semitransparent first reflection film 106 is made of gold (Au), aluminum (Al), and the like, for example. The first reflection film 106 is supposed to have a property of reflecting part of laser light for reproduction while transmitting the remaining, as will be described later in detail. In order to realize this property, not only the selection of an appropriate material for the reflection film, but also the adjustment of the thickness thereof to an appropriate range are required. The thickness of the first reflection film 106 is preferably in the range of 5 to 20 nm. In Example 1, the thickness of the reflection film 106 is 10 nm.

The second optical disk 103 includes a disk-shaped second substrate 107 having a second information surface 108 where a spiral information track composed of convex and concave portions (pits) is formed. A second reflection film 109 is formed on the second information surface 108 of the second substrate 107 by sputtering and the like. The second reflection film 109 is made of aluminum (Al) and the like.

Information is recorded on the first and second information surfaces 105 and 108 with high density, i.e., a track pitch of about 0.74 $\mu$m and a minimum pit length of about 0.4 $\mu$m. The thickness of the second reflection film 109 is smaller than the lengths of the pits formed on the second information surface 108 so that the pits recorded on the second information surface 108 can be transferred well to the second reflection film 109. Specifically, the thickness of the second reflection film 109 is preferably in the range of 30 to 150 nm. In Example 1, the thickness of the second reflection film 109 is 50 nm.

As shown in FIG. 1, an adhesive layer 110 is formed between the first optical disk 102 and the second optical disk 103 for adhering the two optical disks. The adhesive layer 110 is made of an acrylic ultraviolet (UV)-curable material, for example. Such a UV-curable material is applied to at least one of the optical disks 102 and 103. Then, the two optical disks 102 and 103 are put in contact with each other via the UV-curable material, and illuminated with a UV ray to cure the UV-curable material and thus to adhere the two optical disks. Other thermosetting adhesives may also be used instead of the UV-curable material.

A label 111 is attached to the surface of the second optical disk 103. A hole 112 (inner diameter: 15 mm) is formed in the center of the optical recording medium 101 for mounting the optical recording medium 101 on a driving motor.

Now, referring to FIGS. 2A and 2B, the reproduction of information recorded on the first and second information surfaces 105 and 108 will be described.

Figure 2A:
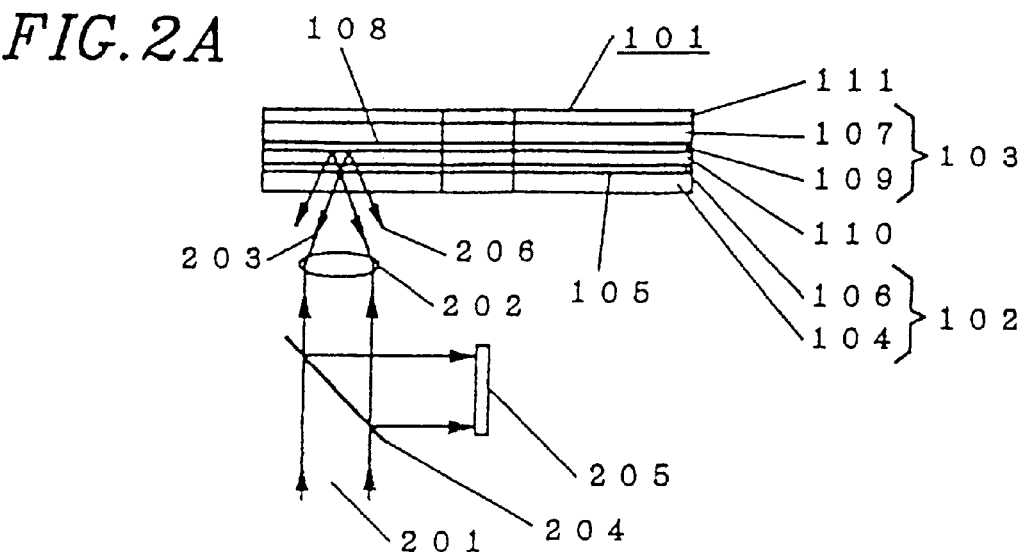
FIGS. 2A and 2B are views showing optical paths of reflected light beams when information recorded on a first information surface and a second information surface, respectively, is reproduced in Example 1.
Figure 2B:
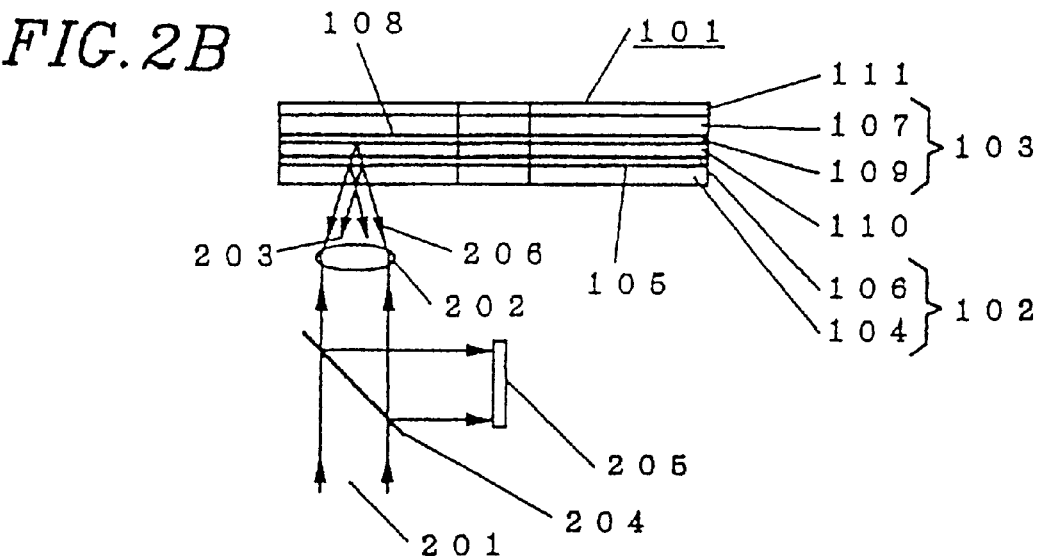

FIG. 2A shows the case where information recorded on the first information surface 105 is read, while FIG. 2B shows the case where information recorded on the second information surface 108 is read. A parallel light beam 201 is converged by a focusing lens 202 and illuminates the optical recording medium 101 from the side opposite to the side of the label 111, i.e., from the side of the first substrate 104.

The focusing lens 202 is designed to be used for optical recording media having a substrate with a thickness of 0.6 mm. Accordingly, a conventional disk having one information surface which has a substrate with a thickness of 0.6 mm is also applicable to the focusing lens 202.

Referring to FIG. 2A, when information recorded on the first information surface 105 is reproduced, the light beam 201 is controlled to be focused on the first information surface 105 by a known focusing control technique. A reflected light beam 203 reflected from the first reflection film 106 is detected by an optical detector 205 via a splitter 204. Thus, the information is read. Referring to FIG. 2B, when information recorded on the second information surface 108 is reproduced, the light beam 201 is controlled to be focused on the second reflection film 109 by the focusing control technique. A reflected light beam 206 reflected from the second reflection film 109 is detected by the optical detector 205, and thus the information is read. For the reproduction of information recorded in the optical recording medium 101, the wavelength of the light beam 201 needs to be 650 nm, and the numeral aperture (NA) of the focusing lens 202 needs to be about 0.6.

When information recorded on the first information surface 105 is reproduced, as shown in FIG. 2A, the reflected light beams 203 and 206 pass through the focusing lens 202 and are received by the optical detector 205. However, the size of the spot of the light beam 201 formed on the second reflection film 109 is in the order of several tens of micrometers, which is considerably larger than the track pitch (0.8 μm) and the minimum pit length (0.5 μm). Thus, a plurality of pits are illuminated with the light beam 201. Accordingly, the reflected light beam 206 hardly includes an individual pit information component, and has a substantially constant light amount as if it is reflected from a surface where no pit is formed. Further, only part of the reflected light beam 206 passes through the focusing lens 202, and the part of the reflected light beam 206 which has passed through the focusing lens 202 is not made parallel. Accordingly, the light amount of the part of the reflected light beam 206 which has reached the optical detector 205 is small. Thus, the pit information detected by the optical detector 205 is mostly composed of components modulated by the pits recorded on the first information surface 105.

When information recorded on the second information surface 108 is reproduced, as shown in FIG. 2B, the reflected light beams 203 and 206 pass through the focusing lens 202 and are received by the optical detector 205. As in the above case, however, the size of the spot of the light beam 201 formed on the first reflection film 106 is in the order of several tens of micrometers, which is considerably large and illuminates a plurality of pits. Accordingly, the reflected light beam 203 hardly includes individual pit information components. Further, since part of the reflected light beam 203 which has passed through the focusing lens 202 is not made parallel, the light amount of the part of the reflected light beam 203 which has reached the optical detector 205 is small. Thus, the pit information detected by the optical detector 205 is mostly composed of components modulated by the pits recorded on the second information surface 108.

Next, the relationship between the reflectances of the first and second reflection films 106 and 109 will be described. In the case where information recorded on the first information surface 105 is read, as the reflectance of the first reflection film 106 is higher, the light amount of the reflected light beam 203 is larger and the quality of the resultant reproduced signal is better. However, in the case where information recorded on the second information surface 108 is read, as the reflectance of the first reflection film 106 is higher, the light amount of the light beam 201 passing through the first reflection film 106 is smaller. Since the reflected light beam 206 reflected from the second reflection film 109 passes through the first reflection film 106 again, the light amount of the reflected light beam 206 is further reduced at the reading of the information recorded on the second information surface 108. In other words, in the case where information recorded on the second information surface 108 is read, the light beam 201 passes through the first substrate 104, the first reflection film 106, and the adhesive layer 110 to reach the second reflection film 109. The reflected light beam 206 reflected from the second reflection film 109 then passes through the adhesive layer 110, the first reflection film 106, and the first substrate 104 again. The light thus passes through the first reflection film 106 twice. Accordingly, if the reflectance of the first reflection film 106 is high, the light amount of the reflected light beam 206 becomes small at the reading of the information recorded on the second information surface 108. In order to overcome this problem, in the optical recording medium 101 of Example 1 according to the present invention, the reflectances of the first and second reflection films 106 and 109 are set so that a light amount $P_2$ of the reflected light beam 206 at the reading of information recorded on the second information surface 108 is substantially the same as a light amount $P_1$ of the reflected light beam 203 at the reading of information recorded on the first information surface 105. In this case, the relationship is expressed by $k_2=k_1/(1-k_1)^2$ where $k_1$ is the reflectance of the first reflection film 106 and $k_2$ is the reflectance of the second reflection film 109.

The above expression is obtained in the following manner. The light amount P1 of the reflected light beam 203 at the reading of information recorded on the first information surface 105 is expressed by $P_1=P_0 \times k_1$. The light amount $P_2$ of the reflected light beam 206 at the reading of information recorded on the second information surface 108 is expressed by $P_2=P_0 \times k_2(1-k_1)^2$. Since $P_1=P_2$, the above expression is obtained. The reflectances $k_1$ and $k_2$ represent the percentage of the reflected light amount with respect to the incident light amount. Specifically, in the optical recording medium 101 of Example 1, the reflectance of the first reflection film 106 is in the range of 20 to 35%, while the reflectance of the second reflection film 109 is 60% or more. The reflectance of the second reflection film 109 is preferably as high as possible. However, in order to realize a reflectance closer to 100% using an inexpensive material such as aluminum, the film thickness needs to be about 0.6 to 0.8 μm. Since a high-density optical disk has a pit length of about 0.5 μm, a reflection film as thick as 0.6 to 0.8 μm lowers the level of the transfer of the information surface onto the reflection film. In order to prevent the lowering of the level of the transfer, the thickness of the second reflection film 109 is made equal to or less than the pit length of the second information surface 108, i.e., 0.5 μm, and thus the reflectance is made 60% or more.

Next, the aberration of the light beam 201 focused by the focusing lens 202 will be described. In the optical recording medium 101 of Example 1, the optical path length of the light beam 201 when information recorded on the first information surface 105 is read and that when information recorded on the second information surface 108 is read are different by the total of the thickness of the first reflection film 106 and a thickness $t_0$ of the adhesive layer 110. Since the thickness of the first reflection film 106 is 0.5 μm or less in the optical recording medium 101 of Example 1, it can be neglected. When the optical path length, i.e., the thickness through which the light beam passes varies, the light beam 201 focused by the focusing lens 202 generates an aberration. The aberration increases in proportion to about the fourth power of the NA of the focusing lens 202.

The relationship between the focusing lens 202 and a thickness $t_1$ of the first substrate 104 will be described. Herein, the thickness $t_1$ of the first substrate 104 is considered to include the thickness of the first reflection film 106 because the thickness of the first reflection film 106 is negligible in comparison with the thickness $t_1$ of the first substrate 104 and the thickness $t_0$ of the adhesive layer 110.

In general, the focusing lens 202 is designed in consideration of the thickness of a substrate of an optical disk. When the thickness of a substrate of an optical disk having one information surface is 0.6 mm, the focusing lens 202 is designed based on the thickness of the substrate of 0.6 mm. When the optical recording medium 101 having the first substrate 104 with the thickness $t_1$ of 0.6 mm is reproduced by use of this focusing lens 202, no problem arises when information recorded on the first information surface 105 is read. However, when information recorded on the second information surface 108 is read, the thickness of the adhesive layer 110 is added to the thickness of the first substrate 104. That is, if the thickness $t_0$ of the adhesive layer 110 is 40 μm, 40 μm is added to the thickness $t_0$ of the first substrate 104, 0.6 mm. This is substantially equal to the case where a substrate with a thickness of 0.64 mm is used. Accordingly, the aberration increases when information recorded on the second information surface 108 is read. This lowers the quality of the reproduced signal. In order to overcome this problem, when the focusing lens 202 designed for an optical recording medium having a 0.6 mm thick substrate is used, the thickness $t_1$ of the first substrate 104 is made 0.58 mm as a standard. Then, the thickness of a substrate of an optical recording medium having dual information surfaces is made slightly thinner than that of a substrate of an optical recording medium having one information surface. As a result, the thickness of the substrate is 0.58 mm when information recorded on the first information surface 105 is read, while it is 0.62 mm when information recorded on the second information surface 108 is read. In the latter case, the thickness of the substrate is equal to the distance between the incident surface of the first substrate 104 and the second information surface 108. The differences between these thicknesses and the design value 0.6 mm for the focusing lens 202 are both 20 μm. Thus, substantially the same quality of reproduced signals can be obtained from the first information surface 105 and the second information surface 108. Naturally, variations are generated in the thickness $t_1$ of the first substrate 104 and the thickness $t_0$ of the adhesive layer 110 in the fabrication process. With the above setting, however, the allowances of these variations are widened.

Figure 7A:
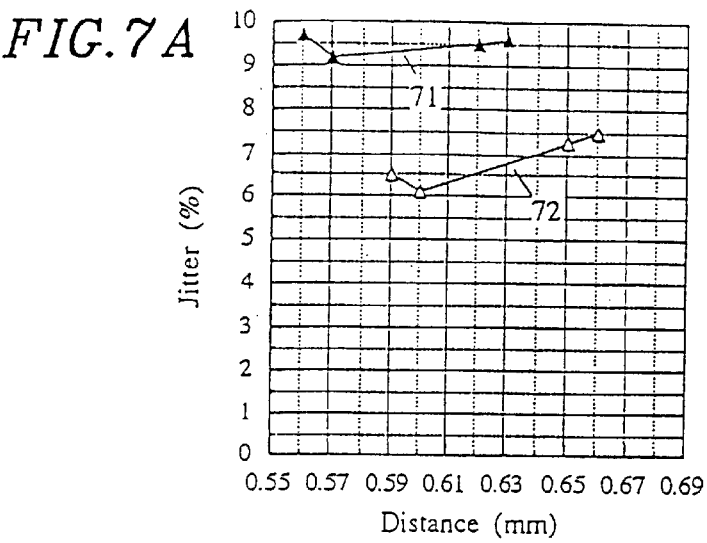
FIGS. 7A to 7C are graphs showing the measurement results of jitters obtained from trial-manufactured optical recording media.
Figure 7B:
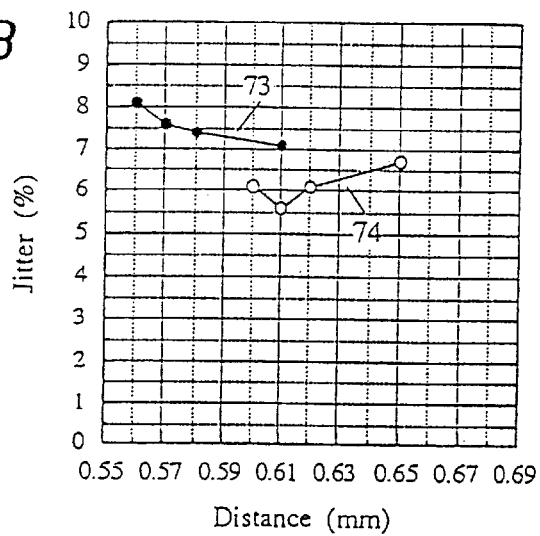
Figure 7C:
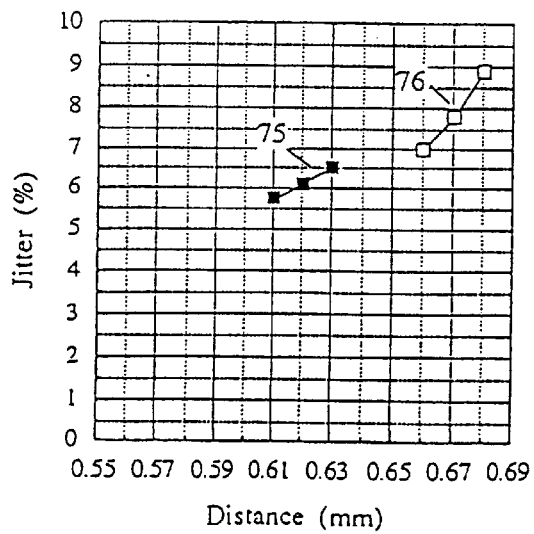

The relationship between the thickness $t_1$ of the first substrate 104 and the thickness $t_0$ of the adhesive layer 110 will be described in more detail with reference to FIGS. 7A to 7C. FIGS. 7A to 7C are graphs showing the measurement results obtained from various trial-manufactured optical recording media. The X-axis of these graphs is the distance between the incident surface of the first substrate 104 and the information surface, and the Y-axis is the jitter of the reproduced signal. The jitter is the value obtained by dividing the standard deviation value of the time-axis variation in the reproduced signal by the period of the channel clock. In Figure 7A, four types of the first optical disks 102 having the first substrate 104 with the thickness $t_1$ of 0.56 mm, 0.57 mm, 0.62 mm, and 0.63 mm were trial-manufactured. Each of these first optical disks 102 was adhered with the second optical disk 103 via the adhesive layer 110 with a thickness of 30 μm. Using the resultant optical recording media, reproduction of information was conducted, and the jitters were measured. The reference numeral 71 shows the jitters obtained when information recorded on the first information surface 105 is reproduced, while the reference numeral 72 shows the jitters obtained when information recorded on the second information surface 108 is reproduced. In FIG. 7B, four types of the first optical disks 102 having the first substrate 104 with the thickness $t_1$ of 0.56 mm, 0.57 mm, 0.58 mm, and 0.61 mm were trial-manufactured. Each of these first optical disks 102 was adhered with the second optical disk 103 via the adhesive layer 110 with a thickness of 40 μm. Using the resultant optical recording media, reproduction of information was conducted, and the jitters were measured. The reference numeral 73 shows the jitters obtained when information recorded on the first information surface 105 is reproduced, while the reference numeral 74 shows the jitters obtained when information recorded on the second information surface 108 is reproduced. In FIG. 7C, three types of the first optical disks 102 having the first substrate 104 with the thickness $t_1$ of 0.61 mm, 0.62 mm, and 0.63 mm were trial-manufactured. Each of these first optical disks 102 was adhered with the second optical disk 103 via the adhesive layer 110 with a thickness of 50 μm. Using the resultant optical recording media, reproduction of information was conducted, and the jitters were measured. The reference numeral 75 shows the jitters obtained when information recorded on the first information surface 105 is reproduced, while the reference numeral 76 shows the jitters obtained when information recorded on the second information surface 108 is reproduced.

In general, when information recorded on a disk is reproduced, defocusing and off-tracking arise due to deflection and decentering of the disk, vibration and shock applied to the apparatus from outside, and the like. These deteriorate the jitter of the reproduced signal. The jitter of the reproduced signal is also deteriorated when the disk and the optical axis of the light beam are inclined against each other. This warp of the disk varies depending on a change of the environmental conditions such as humidity. A variation among optical heads in the fabrication process and a variation of each optical head with time should also be considered. Accordingly, in order to reproduce information recorded on a disk with high reliability, the jitter of a reproduced signal is about 10% at maximum in consideration of the deterioration of the jitter due to various factors described above.

In comparison between FIGS. 7A and 7B, the following are observed. When the thickness $t_0$ of the adhesive layer 110 is 30 μm, the jitter of the reproduced signal obtained from the first information surface little changes. The value is kept at and around 9.5%, irrespective of the change in the thickness $t_1$ of the first substrate 104 from 0.56 mm to 0.63 mm. On the contrary, when the thickness $t_0$ of the adhesive layer 110 is 40 μm, the jitter of the reproduced signal obtained from the first information surface is higher as the thickness $t_1$, of the first substrate 104 is thinner. This indicates that, when the thickness $t_0$ of the adhesive layer 110 is as thin as 30 μm, the influence of a leak signal from the second information surface is greater than the influence of the aberration due to the change in the thickness $t_1$ of the first substrate 104. It is therefore expected that, if the thickness $t_0$ of the adhesive layer 110 is smaller than 30 μm, the leak signal from the second information surface will be greater and the quality of the reproduced signal will be eminently reduced. Accordingly, the thickness $t_0$ of the adhesive layer 110 should be 30 μm or more.

From FIG. 7B, it is observed that the jitter of the reproduced signal obtained from the first information surface 105 starts increasing sharply when the thickness $t_1$ of the first substrate 104 is in the range of 0.58 to 0.56 mm. This is because, when the thickness $t_0$ of the adhesive layer 110 is 40 μm, the influence of the aberration due to the change in the thickness $t_1$ of the first substrate 104 becomes greater than the influence of a leak signal from the second information surface. The jitter of the reproduced signal changes substantially parabolically with the change in the thickness $t_1$ of the first substrate 104. It is therefore expected that, if the thickness $t_1$ of the first substrate 104 is smaller than 0.56 mm, the jitter of the reproduced signal will sharply increase. Accordingly, the thickness $t_1$ of the first substrate 104 should be 0.56 mm or more.

The total of the thickness $t_1$ of the first substrate 104 and the thickness $t_0$ of the adhesive layer 110, i.e., ($t_0+t_1$) is the thickness of a substrate existing when information recorded on the second information surface 108 is reproduced. From FIG. 7C, it is observed that the jitter of the reproduced signal starts increasing sharply when the thickness ($t_0+t_1$) is in the range of 0.66 to 0.68 mm. The jitter changes substantially parabolically with the change in the thickness $t_1$ of the first substrate 104. It is therefore expected that, if the thickness ($t_0+t_1$) of the substrate is 0.69 mm, the jitter of the reproduced signal will exceed 10%. Accordingly, in order to obtain a jitter of the reproduced signal of 10% or less, the total of the thickness $t_1$ of the first substrate 104 and the thickness $t_0$ of the adhesive layer 110, i.e., ($t_0+t_1$) should be 0.68 mm or less.

The above values are very strict. In order to secure the reliability of the device, severe examination is required for each component of the device. Since the allowances are too narrow to allow mass production, the cost of each device becomes high. The allowances should be widened in order to manufacture the devices easily. This point will be described in more detail as follows.

When information recorded on the first information surface 105 is reproduced, as the thickness $t_0$ of the adhesive layer 110 is larger, the influence of a leak signal from the second information surface 108 is smaller. As is observed from the comparison between FIGS. 7A and 7B, the thickness $t_0$ of the adhesive layer 110 is desirably 40 μm or more when information recorded on the first information surface 105 is reproduced. Further, when the thickness $t_1$ of the first substrate 104 is 0.56 mm or more, the jitter of the reproduced signal can be as small as 8%.

As is observed from FIG. 7A, when the distance between the surface of the first substrate 104 and the second information surface 108 is 0.66 mm, the jitter of the reproduced signal is 7.5%. From FIG. 7B, when the above distance is 0.65 mm, the jitter is 6.6%. From FIG. 7C, when the above distance is 0.66 mm, 0.67 mm, and 0.68 mm, the jitter is 7%, 7.8%, and 8.8%, respectively. Thus, when the above distance exceeds 0.66 mm, the jitter of the reproduced signal sharply increases. Accordingly, the thickness of the substrate existing when information recorded on the second information surface 108 is reproduced, i.e., the total of the thickness $t_1$ of the first substrate 104 and the thickness $t_0$ of the adhesive layer 110 is desirably 66 mm or less.

When the focusing lens 202 is designed for an optical recording medium having a 0.6 mm thick substrate, the thickness of the substrate preferably varies with 0.6 mm as the center of the variation. Accordingly, when the thickness of the first substrate 104 is 0.56 mm or more, it can be defined as 0.58 mm±0.02 mm. Therefore, in order to obtain the total of the thickness of the first substrate 104 and the thickness of the adhesive layer 110 of 0.66 mm, the thickness of the adhesive layer 110 should be 60 μm or less.

From the above description, it is understood that, by setting the thickness $t_0$ of the adhesive layer 110 in the range of 40 to 60 μm and the thickness $t_1$ of the first substrate 104 in the range of 0.56 mm to 0.6 mm, the jitters of the reproduced signals obtained from the first and second information surfaces 105 and 108 are both low, and thus reproduced signals with excellent quality can be obtained.

Now, the direction of the spiral tracks of the first and second optical disks 102 and 103 will be described. For example, when the spiral track of the first optical disk 102 is formed from the inner side to the outer side and the spiral track of the second optical disk 103 is also formed from the inner side to the outer side, interactive reproduction can be realized by using one optical head for the reproduction from the dual information surfaces. For example, a program of a game having a plurality of branches may be recorded on the dual information surfaces separately. In the game, upon receipt of branching instruction, the program can instantaneously move from the first information surface 105 to the second information surface 108 or from the second information surface 108 to the first information surface 105 by focus jumping.

Alternatively, when the spiral track of the first optical disk 102 is formed from the inner side to the outer side, and the spiral track of the second optical disk 103 is formed from the outer side to the inner side, continuous reproduction can be easily realized by using one optical head for the reproduction from the dual information surfaces. That is, information is first reproduced from the first information surface 105 by moving the optical head from the inner side to the outer side of the disk. when the optical head reaches the outermost side, the focusing is instantaneously jumped from the first information surface 105 to the second information surface 108. Then, information recorded on the second information surface 108 is reproduced from the outer side to the inner side. This procedure allows for long-time continuous reproduction of a movie and the like. Such an optical recording medium including the first and second optical disks of which spiral tracks are formed in directions reverse to each other is obtained in the following manner: At the cutting of the original disks, signals are recorded in the first optical disk 102 by moving the optical head from the inner side to the outer side of the disk. When signals are to be recorded in the second disk 103, the disk is rotated reversely, and the optical head is moved from the outer side to the inner side of the disk.

Thus, in the optical recording medium in Example 1, the first and second optical disks are adhered via an adhesive having a predetermined thickness. Information recorded on both the first and second information surfaces is reproduced by illuminating the surfaces with a light beam from one side of the optical recording medium. Thus, a label can be attached to the other side. Further, since information recorded on both the first and second information surfaces is reproduced only by changing the position of the focusing point by use of one optical head, interactive reproduction or long-time continuous reproduction of a movie is possible. This also reduces the cost of an recording/reproducing apparatus. Moreover, since the thicknesses of the first and second optical disks are the same, these optical disks little change in shape with the change in humidity. This facilitates the adhesion of these optical disks, and thus lowers the cost of the disks.

EXAMPLE 2

In Example 2, an optical recording medium which can be used for different types of optical recording/reproducing apparatuses designed for optical recording media having substrates with different thicknesses will be described.

Figure 3:
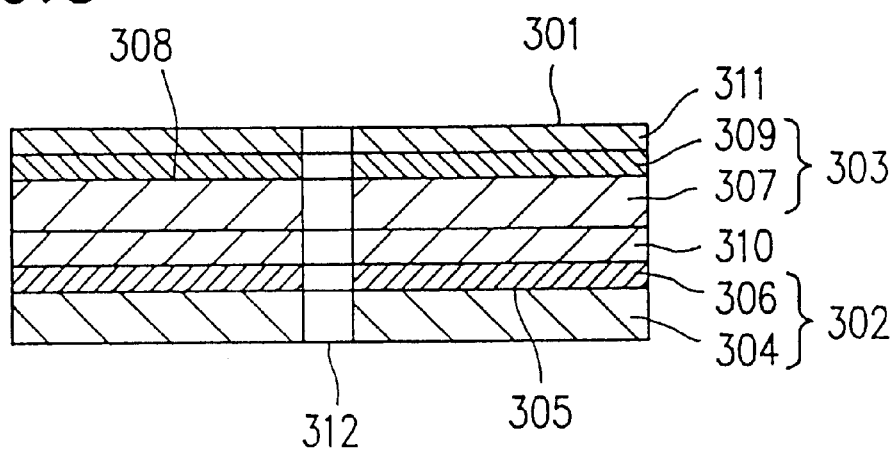
FIG. 3 is a sectional view of an optical recording medium of Example 2 according to the present invention.

FIG. 3 shows a schematic sectional view of an optical recording medium from which information can be read by both an apparatus designed for a recording medium with a 1.2 mm thick substrate and an apparatus designed for a recording medium with a 0.6 mm thick substrate.

An optical recording medium 301 of Example 2 is composed of a first optical disk 302 and a second optical disk 303 adhered to each other. The same information is stored in the first and second optical disks 302 and 303. The first optical disk 302 includes a disk-shaped first substrate 304 with a thickness of 0.6 mm having a first information surface 305 where a spiral information track composed of convex and concave portions (pits) is formed. A semitransparent first reflection film 306 is formed on the first information surface 305 of the first substrate 304 by sputtering and the like. The second optical disk 303 stores completely the same information as that in the first optical disk 302 in the same way. The second optical disk 303 includes a disk-shaped second substrate 307 with a thickness of 0.6 mm having a second information surface 308 where a spiral information track composed of convex and concave portions (pits) is formed. A second reflection film 309 of aluminum and the like is formed on the second information surface 308 of the second substrate 307 by sputtering and the like. The reference numeral 310 denotes an adhesive layer made of a UV-curable material for adhering the first and second optical disks 302 and 303. The reference numeral 311 denotes a label for identifying the optical recording medium. The reference numeral 312 denotes a hole for mounting the optical recording medium 301 on an optical recording/reproducing apparatus.

Figure 4A:
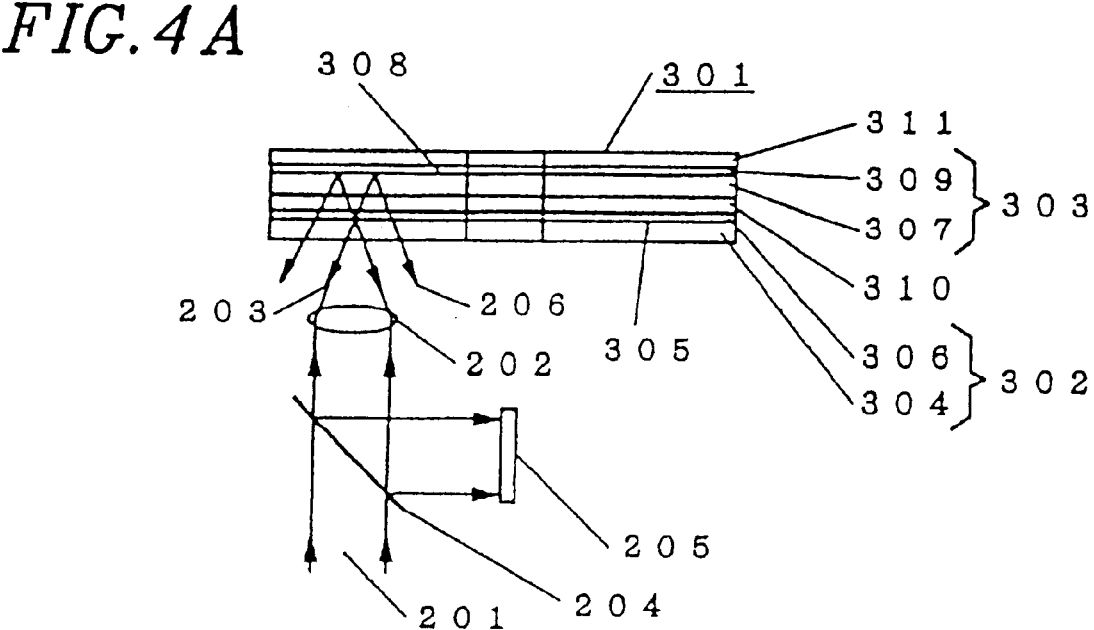
FIGS. 4A and 4B are views showing optical paths of reflected light beams when information recorded on a first information surface and a second information surface, respectively, is reproduced in Example 2.

The reproduction of information recorded on the first and second information surfaces 305 and 308 will be described with reference to FIGS. 4A and 4B. FIG. 4A shows the case where information recorded on the first information surface 305 is read by use of an apparatus designed for an optical recording medium having a 0.6 mm thick substrate. FIG. 4A is basically the same as FIG. 2A. That is, a parallel light beam 201 is converged by a focusing lens 202 designed for a 0.6 mm thick substrate and illuminates the optical recording medium 301 from the side of the first substrate 304. The light beam 201 is partly reflected from the first reflection film 306 and a reflected light beam 203 is detected by an optical detector 205 via a splitter 204. Thus, the information is read.

Figure 4B:
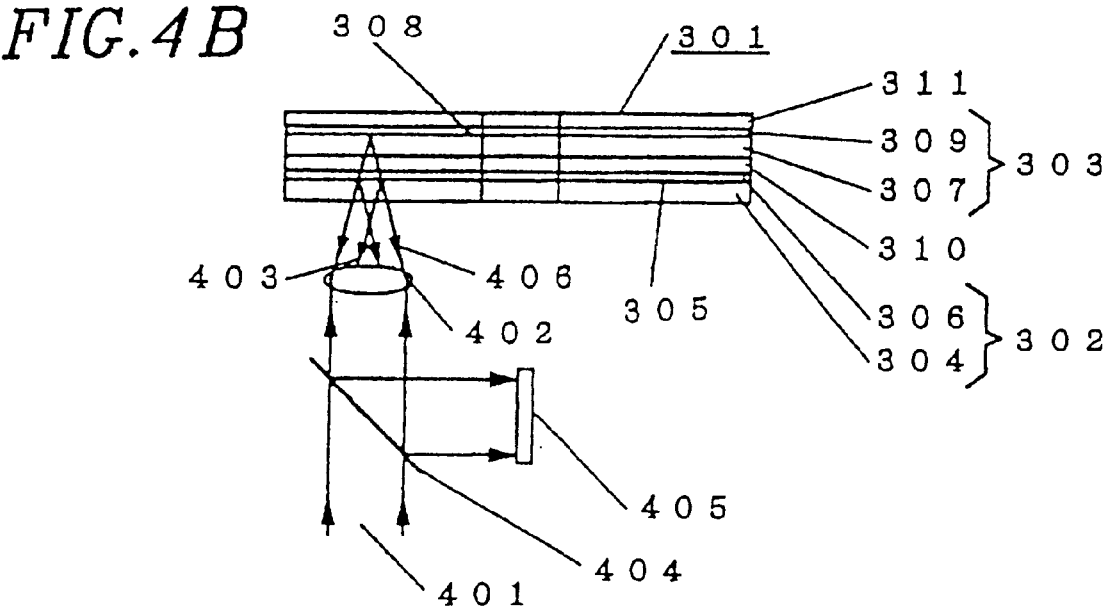

FIG. 4B shows the case where information recorded on the second information surface 308 is read by use of an apparatus designed for an optical recording medium having a 1.2 mm thick substrate. Referring to FIG. 4B, when information recorded on the second information surface 308 is reproduced, a parallel light beam 401 is converged by a focusing lens 402 designed for a 1.2 mm thick substrate and illuminates the optical recording medium 301 from the side of the first substrate 304. The light beam 401 passes through the first substrate 304, the first reflection film 306, the adhesive layer 310, and the second substrate 307 and reaches the second information surface 308. The light beam 401 is partly reflected from the second reflection film 309, and a reflected light beam 406 passes through the second substrate 307, the adhesive layer 310, the first reflection film 306, the first substrate 304, and the focusing lens 402. The reflected light beam 406 is then detected by an optical detector 405 via a splitter 404. Thus, the information is read.

As shown in FIG. 4A, when information recorded on the first information surface 305 is reproduced, the reflected light beams 203 and 206 pass through the focusing lens 202 and are received by the optical detector 205. However, the size of the, spot of the light beam 201 formed on the second reflection film 309 is as large as 1 mm or more, and thus a plurality of pits are illuminated with the light beam 201. Also, the reflected light beam 206 which has passed through the focusing lens 202 is not made parallel. Accordingly, the light amount of the reflected light beam 206 which has reached the optical detector 205 is extremely small. Thus, pit information components obtained from the second information surface 308 are hardly detected by the optical detector 205.

As shown in FIG. 4B, as in the above case, when information recorded on the second information surface 308 is reproduced, the reflected light beams 403 and 406 pass through the focusing lens 402 and are received by the optical detector 405. However, the size of the spot of the light beam 401 formed on the first reflection film 306 is as large as 1 mm or more, and thus a plurality of pits are illuminated with the light beam 401. Also, the reflected light beam 406 which has passed through the focusing lens 402 is not made parallel. Accordingly, pit information components obtained from the first information surface 305 are hardly detected by the optical detector 405.

The relationship between the reflectances of the first and second reflection films 306 and 309 in the optical recording medium 301 of Example 2 is basically the same as that of the optical recording medium 101 of Example 1. In the optical recording medium 301, however, information recorded on the second information surface 308 is not required to be transferred to the second reflection film 309. This enables the second reflection film 309 to be thickened, and thus a reflectance of 90% or more can be obtained.

As described above, when the optical recording medium 301 shown in FIG. 3 is used as an apparatus designed for a 1.2 mm thick substrate, the light beam 401 passes through the first and second substrates 304 and 307, the first reflection film 306, and the adhesive layer 310. When the thicknesses of the first and second substrates 304 and 307 are 0.6 mm, the total thickness exceeds 1.2 mm by the thickness of the adhesive layer 310, though the thickness of the first reflection film 306 is negligible. This causes aberration. In order to solve this problem, the thickness of the adhesive layer 310 is preferably several tens of micrometers or less. Alternatively, the thickness of the second substrate 307 may be thinned by the thickness of the adhesive layer 310.

The first and second information surfaces 305 and 308 may have different formats from each other. For example, information may be recorded on the second information surface 308 with the format of conventional CDs so that the information can be reproduced by widely-available CD players. In general, the density of CDs is low and the capacity thereof is only a quarter or so of that of the optical disk according to the present invention. Accordingly, for example, while the entire movie may be recorded on the first information surface 305, an edited version of the movie shortened by cutting part thereof may be recorded on the second information surface 308. In this case, since a light beam with a wavelength of 780 nm is used for reproduction from CDs, the first reflection film 306 should have the optical property of reflecting a 650 nm light beam and transmitting a 780 nm light beam. This increases the reflected light amount and thus the S/N ratio of the resultant reproduced signal.

As described above, in Example 2, since the same information is recorded in the first and second optical disks, the same information can be read by both an apparatus designed for an optical recording medium having a 1.2 mm thick substrate and an apparatus designed for an optical recording medium having a 0.6 mm thick substrate. Also, since both the first and second information surfaces are illuminated with a light beam from one side of the optical recording medium, a label can be attached to the. other side.

EXAMPLE 3

In Example 3, an optical recording medium having a first information surface for reproduction only and a second information surface for recording and reproduction will be described. The reproduction or recording of information is conducted by illuminating the optical recording medium with a light beam from only one side.

Figure 5:
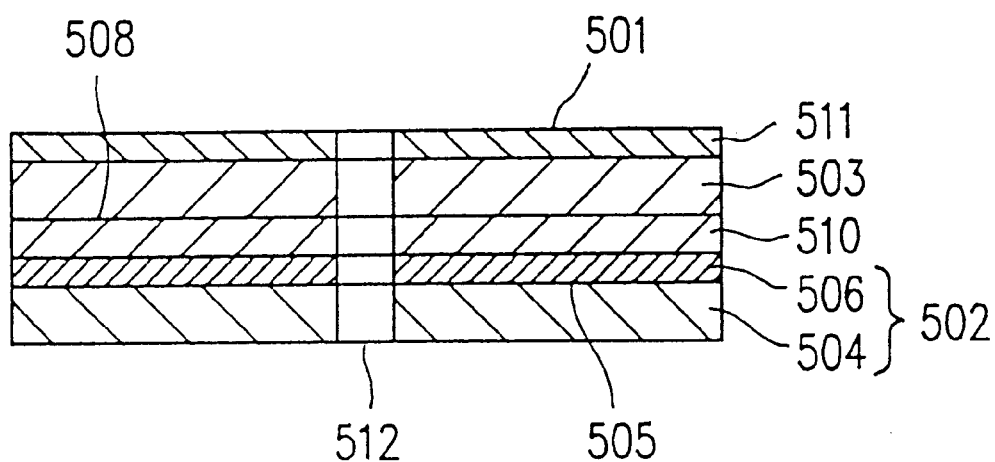
FIG. 5 is a sectional view of an optical recording medium of Example 3 according to the present invention.

FIG. 5 is an exaggerated sectional view of an optical recording medium 501 of Example 3. The optical recording medium 501 is composed of a first optical disk 502 for reproduction only and a second optical disk 503 for recording and reproduction adhered to each other. The first optical disk 502 includes a disk-shaped substrate 504 with a thickness of 0.6 mm having a first information surface 505 where a spiral information track composed of convex and concave portions (pits) is formed. A semitransparent reflection film 506 is formed on the first information surface 505 of the substrate 504 by sputtering and the like. The second optical disk 503 includes a substrate with a thickness of 0.58 mm having a second information surface where a spiral information track composed of minute convex and concave portions (grooves) is formed. The reference numeral 510 denotes an adhesive layer for adhering the first and second optical disks 502 and 503. The reference numeral 511 denotes a label for identifying the optical recording medium. The reference numeral 512 denotes a hole for mounting the optical recording medium 501 on an optical recording/reproducing apparatus.

In the optical recording medium 501 shown in FIG. 5, as in the optical recording medium 101 shown in FIG. 1, the first information surface 505 for reproduction only and the second information surface for recording and reproduction are adhered via the adhesive layer 510 so that they are apart from each other by about 40 μm. The optical recording medium 501 is illuminated with a light beam from the side of the first optical disk 502.

Figure 6:
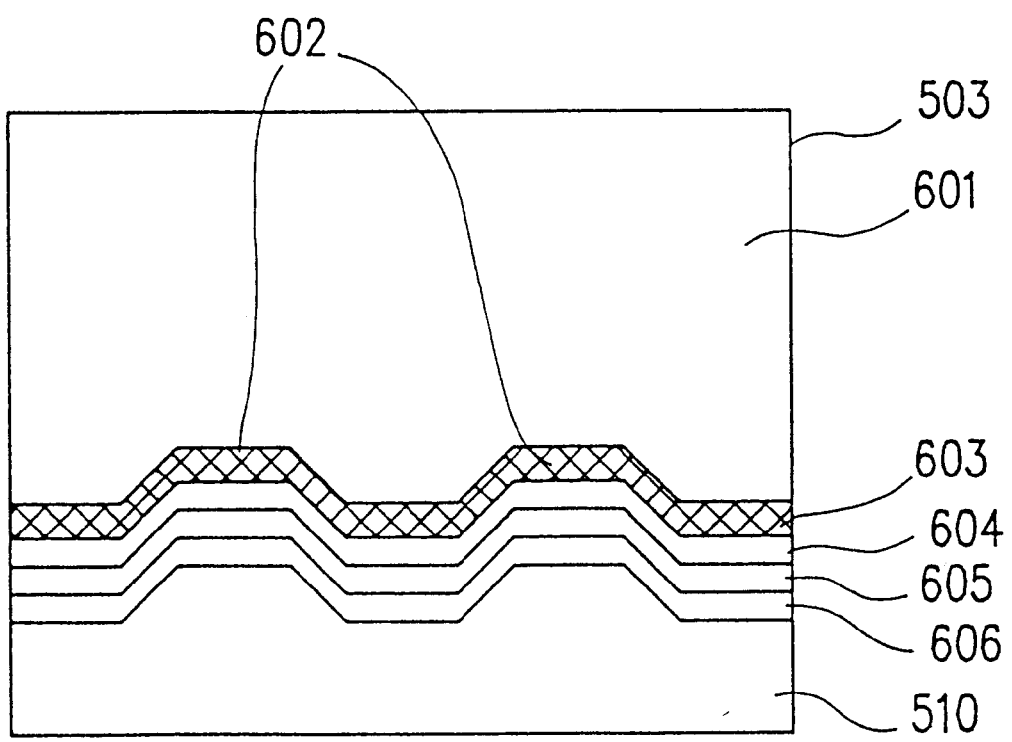
FIG. 6 is an enlarged sectional view showing a second optical disk of the optical recording medium of Example 3.

Referring to FIGS. 5 and 6, the second optical disk 503 will be described. FIG. 6 is an enlarged exaggerated sectional view obtained by cutting the second optical disk 503 in a radial direction. A groove track 602 having convex and concave portions is formed on one surface of a substrate 601 of the second optical disk 503. Then, a reflection film 603 made of aluminum and the like, a dielectric film 604 made of $SiO_2$ and the like, a recording material film 605, and another dielectric film 606 are formed consecutively in this order by sputtering and the like. The reflection film 603 is disposed to enhance the sensitivity and protect the recording material film 605 from thermal shock by facilitating heat radiation. The recording material film 605 is formed, for example, by sputtering a phase-change type recording material containing tellurium (Te), antimony (Sb), and germanium (Ge) as main components. The dielectric films 604 and 606 are formed to protect the recording material film 605 from humidity or thermal shock. These dielectric films can be omitted.

The phase-change type recording material becomes crystalline when gradually cooled after heating and becomes amorphous when abruptly cooled after melting. This property is used in the phase-change type disk, where the crystalline state and the amorphous state of the phase-change type recording material is reversibly changed to each other, so that information can be over-written repeatedly as is done on magnetic disks such as floppy disks and hard disks. Information is recorded on the phase-change type disk as follows. The disk is rotated at a predetermined speed. While the tracking is controlled so as to locate a light beam along the groove track, the intensity of the light beam is changed between the strong amorphous level and the weak crystalline level depending on the signal to be recorded. For example, in the case where the recording is conducted so that the recording mark is in the amorphous state, a light beam with a light amount large enough to melt the film is radiated so as to form a mark in the amorphous state on the film. On the contrary, during the period when no mark is to be formed, a light beam with a light amount small enough to prevent the film from melting is radiated, so as to crystallize the position of the film. At this time, therefore, the position of the film is crystallized regardless of the previous state of the position, amorphous or crystalline. Thus, even the position of the film where information has been recorded is overwritten. The reproduction of the information recorded on the phase-change type disk is conducted based on the principle that the reflectances of the amorphous state and the crystalline state are different from each other. For example, the disk is illuminated with a constant weak light beam, a reflected light beam from the disk is detected by an optical detector, and a detected variation in the reflected light amount is used to reproduce information.

As described above, the optical recording medium 501 of Example 3 is constructed to receive a light beam from the side of the first optical disk 502. The reason is as follows. Information is recorded in the second optical disk 503 for recording and reproduction by use of heat obtained by absorbing the light beam. Thus, in order to conduct the recording using a light beam with a small light amount, about 60% of the light beam needs to be absorbed by the second optical disk. Accordingly, when the reflectance is about 20%, the transmittance is as small as 20%. If the optical recording medium is constructed to receive a light beam from the side of the second optical disk 503, in reverse to the case of Example 3, the reflected light amount required at the reading of information recorded on the first information surface 505 will become extremely small. For example, the reflected light amount will be only 4% of the incident light amount after passing through the second optical disk 503 twice even if the reflectance of the reflection film 506 is 100%. The above trouble is avoided in the case of the optical recording medium 501 according to the present invention, which receives a light beam from the side of the first optical disk 502. The absorbance of the second optical disk 503 can be as large as 60%, while the reflectance thereof can be 40%. Thus, when the reflectance of the reflection film 506 is 20%, for example, a reflected light amount of about 20% of the incident light amount is obtained in the case where information recorded on the first information surface 505 is read, and a reflected light amount of about 26% of the incident light amount is obtained in the case where information recorded in the second optical disk 503 is read. When information recorded in the first optical disk 502 for reproduction only is reproduced, the incident light beam is greatly modulated by pits formed on the first information surface 505. Accordingly, a reproduced signal with sufficiently high quality can be obtained even when the reflectance of the first reflection film 506 is as low as 20%.

As described above, since the optical recording medium 501 of Example 3 is constructed to receive a light beam from the side of the first optical disk 502 for reproduction only, reproduction from both the first and second optical disks 502 and 503 can be conducted with high reliability.

Thus, in Example 3, the first and second optical disks 502 and 503 are adhered with an adhesion with a predetermined thickness, and the information surfaces of the two optical disks are illuminated with a light beam from one side of the optical recording medium. Accordingly, a label can be attached to the other side of the optical recording medium. Also, since information recorded on the dual information surfaces can be reproduced only by changing the position of the focusing point of a light beam by use of one optical head, interactive reproduction is possible, and the cost of the optical recording/reproducing apparatus is reduced. Further, the optical disk for reproduction only and the optical disk for recording and reproduction are combined to form an optical recording medium. Accordingly, for example, information recorded in the optical disk for reproduction only may be processed and the processed information may be recorded in the optical disk for recording and reproduction. This makes it easy to handle the information since related information is stored in the same optical recording medium. Since the thicknesses of the first and second optical disks are the same, these optical disks little change in shape with the change in humidity. This facilitates the adhesion of the optical disks, and thus lowers the cost of the optical recording/reproducing medium.

Incidentally, a recording material film similar to the recording material film 605 used in Example 3 may be formed on the second information surface 308 of the optical recording medium of Example 2. Such a recording material film should be formed between the second information surface 308 and the second reflection film 309 of the second optical disk 303.

Thus, according to the present invention, the first optical disk including the semitransparent reflection film formed on the first information surface where information is recorded and the second optical disk including the reflection film formed on the second information surface where information is recorded are adhered with a transparent adhesive so that the information surfaces are closer to each other. Accordingly, the information recorded on the dual information surfaces can be read by illuminating the surfaces with a light beam radiated from one side of the optical recording medium. Thus, nearly double the amount of information can be consecutively reproduced. Since a label can be attached to the other side of the optical recording medium, the identification of the optical recording medium is easy.

The thicknesses of the first substrate and the adhesive layer are-set at predetermined values. Accordingly, the jitters of reproduced signals obtained from the first and second information surfaces are low, and thus reproduced signals with high quality can be obtained.

Alternatively, according to the present invention, the thicknesses of the first and second substrates are made substantially the same, and these substrates are adhered to each other so that the first information surface of the first substrate faces the surface of the second substrate opposite to the second information surface. Such an optical recording medium can be used for both an apparatus designed for an optical recording medium with a 1.2 mm thick substrate and an apparatus designed for an optical recording medium with a 0.6 mm thick substrate.

Alternatively, according to the present invention, the optical disk for reproduction only and the optical disk for recording and reproduction are adhered to each other. Information recorded in the optical disk for reproduction only may be processed, for example, and the processed information may be recorded in the optical disk for recording and reproduction. This makes it easy to handle the information since related information is stored in one optical recording medium.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical recording medium comprising:
   a first substrate having a first information surface;
   a semitransparent reflection film formed on the first information surface of the first substrate;
   a second substrate having a second information surface;
   a recording material film formed on the second information surface of the second substrate, said recording material film for both recording and reproducing information; and
   an adhesive layer for adhering the first substrate and the second substrate,
   wherein information for only reproduction is formed on the first information surface of the first substrate in a form of convex and concave pits, the reading of the information formed on the first information surface of the first substrate or the recording of information onto the recording material film formed on the second information surface of the second substrate is performed using a light beam coming from a side of the first substrate.

2. An optical recording medium according to claim 1, wherein the thickness of the first substrate is substantially the same as the thickness of the second substrate.

3. An optical recording medium according to claim 1, wherein the adhesive layer adheres the first substrate and the second substrate so that the first information surface and the second information surface face each other.

4. An optical recording medium according to claim 3, wherein the thickness of the first substrate is 0.56 mm or more, the thickness of the adhesive layer is 30 $\mu$m or more, and the total thickness of the first substrate and the adhesive layer is 0.68 mm or less.

5. An optical recording medium according to claim 1, wherein the recording material film is made of a phase-change type recording material.

6. An optical recording medium according to claim 1, wherein a label is formed on a surface of the second substrate.

7. An optical recording medium according to claim 1, wherein a spiral track is formed on each of the first and second substrates, and the direction of the formation of the spiral track on the first substrate is the same as the direction of the formation of the spiral track on the second substrate when the spiral tracks are viewed from the side of a surface of the first substrate opposite to the first information surface.

8. An optical recording medium according to claim 1, wherein a spiral track is formed on each of the first and second substrates, and the direction of the formation of the spiral track on the first substrate is reverse to the direction of the formation of the spiral track on the second substrate when the spiral tracks are viewed from the side of a surface of the first substrate opposite to the first information surface.

9. An optical recording medium according to claim 1, wherein the first reflection film has an optical property for reflecting light of a first wavelength and for transmitting light of a second wavelength, the light of the first wavelength being used for reading the first information recorded on the first information surface and the light of the second wavelength being used to read second information recorded on the second information surface through the second substrate, the adhesive layer, the first reflection film and the first substrate.

10. An optical recording medium according to claim 9, wherein the first wavelength is 650 nm and the second wavelength is 780 nm.

11. An optical recording medium according to claim 1, wherein the first information surface has a first format for recording information, and the second information surface has a second format for recording information, the first format being different from the second format.

12. An optical recording medium according to claim 11, wherein the first format has a recording density higher than that of the second format.

13. An optical recording medium according to claim 11, wherein the second format has a recording density higher than that of the first format.

* * * * *